United States Patent
Cappellotto (10) Patent No.: US 7,744,165 B2
(45) Date of Patent: Jun. 29, 2010

(54) SPOKED WHEEL FOR TIRES

(75) Inventor: Guido Cappellotto, Arcore (IT)

(73) Assignee: Alpina Raggi S.p.A., Lomagna (LC) (IT)

( * ) Notice: Subject to any disclaimer, the term of this patent is extended or adjusted under 35 U.S.C. 154(b) by 93 days.

(21) Appl. No.: 10/582,724

(22) PCT Filed: Dec. 17, 2004

(86) PCT No.: PCT/IT2004/000708

§ 371 (c)(1),
(2), (4) Date: Jun. 13, 2006

(87) PCT Pub. No.: WO2005/058613

PCT Pub. Date: Jun. 30, 2005

(65) Prior Publication Data

US 2007/0057566 A1    Mar. 15, 2007

(30) Foreign Application Priority Data

| Dec. 18, 2003 | (IT) | PD2003A0305 |
| Apr. 28, 2004 | (EP) | 04010074 |
| Sep. 16, 2004 | (EP) | 04022061 |

(51) Int. Cl.
B60B 21/06    (2006.01)

(52) U.S. Cl. ............... 301/58; 301/67; 301/104

(58) Field of Classification Search ............... 301/58, 301/104, 67, 68, 69, 70, 55, 95.101
See application file for complete search history.

(56) References Cited

U.S. PATENT DOCUMENTS

| 476,433 | A | * | 6/1892 | Vetterlein | 301/58 |
| 693,011 | A | * | 2/1902 | Hawk | 301/58 |
| 1,043,283 | A | * | 11/1912 | Zarth | 301/56 |
| 4,729,605 | A | * | 3/1988 | Imao et al. | 301/104 |
| 4,824,177 | A | | 4/1989 | Aloy | |
| 5,806,935 | A | * | 9/1998 | Shermeister | 301/58 |
| 6,224,165 | B1 | * | 5/2001 | Mercat et al. | 301/58 |
| 6,666,525 | B1 | * | 12/2003 | Schroepfer | 301/80 |
| 6,886,892 | B2 | * | 5/2005 | Chiang et al. | 301/58 |
| 2002/0060494 | A1 | * | 5/2002 | Leo et al. | 301/67 |
| 2005/0242658 | A1 | * | 11/2005 | Carlson et al. | 301/58 |
| 2008/0036287 | A1 | * | 2/2008 | Alberio et al. | 301/58 |

FOREIGN PATENT DOCUMENTS

| EP | 1 209 006 A1 | 5/2002 | |
| JP | 60-38201 | * 2/1985 | 301/58 |
| JP | 60038201 A | * 2/1985 | |

(Continued)

OTHER PUBLICATIONS

Int'l Search Report for PCT/IT2004/000708 dated Apr. 26, 2005.

*Primary Examiner*—Russell D Stormer
(74) *Attorney, Agent, or Firm*—RatnerPrestia (57) ABSTRACT

A spoked wheel includes a rim with a plurality of holes for a respective plurality of nipples and an equal plurality of spokes secured to the rim by these nipples. The nipples are arranged to be fitted so as to be substantially gastight in the respective holes in the rim for the purpose of fitting tubeless tires to the rim.

14 Claims, 9 Drawing Sheets

FOREIGN PATENT DOCUMENTS

| | | | | |
|---|---|---|---|---|
| JP | 63-265701 | * | 11/1988 | ................. 301/58 |
| JP | 63265701 A | * | 11/1988 | |
| JP | 01-160701 | | 6/1989 | |
| JP | 4-8601 | * | 1/1992 | ................. 301/58 |
| JP | 2000-127701 | | 5/2000 | |
| JP | 2003-146001 | | 5/2003 | |
| WO | WO 93/09963 | | 5/1993 | |

* cited by examiner

SPOKED WHEEL FOR TIRES

This application is a U.S. National Phase Application of PCT International Application PCT/IT2004/000708 and incorporated by reference herein.

BACKGROUND OF THE INVENTION

The invention relates to a spoked wheel of the type including a rim with a plurality of holes for a respective plurality of nipples, and an equal plurality of spokes secured to the rim by means of the nipples.

Wheels of the above-mentioned type are widely used on both pedal cycles and motorcycles. In the latter case in particular, a need has been felt to use pneumatic tires of the tubeless type, without an inner tube.

These tires have the advantage of deflating relatively slowly in case of a puncture and are therefore suited to the high speeds which may occur in the case of motorcycles.

On the other hand, the use of tubeless tires is not compatible with spoked wheels unless these incorporate special characteristics.

A first type of spoked wheel designed for cycle use with tubeless tires provides for the rim to have a double channel. The first channel is formed between the rim and the tire and provides an airtight seal designed to form the inflation chamber of the tire. The second channel, provided with holes, is used for fitting the spoke anchorage devices. Examples of this technical solution are described in U.S. Pat. No. 6,474,746 and US 2003/0025383 A1.

However, this type of wheel is not well suited to motorcycle use since it increases appreciably the mass of the rim in rotation. Moreover, it has been found that in wet conditions water tends to accumulate in the second channel (which is not airtight) with disadvantages such as an increase of the mass in rotation, corrosion phenomena and worse still appreciable wheel imbalance.

Another type of wheel for the fitting of tubeless tires is described in Japanese patent 2003146001, European patent 1209006 and U.S. Pat. No. 4,824,177. In this case, however, external sealing means are used to eliminate the problem of airtightness between the nipple and the rim.

This type of solution provides relatively unreliable sealing which is likely to be damaged if impacts occur.

Moreover, it has been found that a serious sealing problem is caused by relative movement between the rim and the nipple due to the inevitable elastic deformation of the rim during use. This is because there may be axial displacement of the nipple and of the spoke secured to it due to the effect of deformation of the rim by even a few millimetres and, when seals are inserted between the nipple and the rim, it is clear that this may cause pressure losses in the inflation chamber of the tire and may even cause sudden deflation of the tire.

SUMMARY OF THE INVENTION

The main problem addressed by the invention is to make available a spoked wheel structurally and functionally designed to be suitable for the fitting of tubeless tires with the high degree of reliability necessary for use on high-speed motorcycles.

A further purpose of the invention is to make available a spoked wheel structure capable of overcoming all the troublesome technical disadvantages noted with reference to the known technology.

These problems are solved and these purposes are achieved by the invention of a spoked wheel including a rim with a plurality of holes for a respective plurality of nipples, and an equal plurality of spokes secured to the rim by means of the nipples. The nipples are arranged to be fitted so as to be substantially gastight by screwing into the respective holes in the rim for the purpose of fitting tubular tires to the rim. And the nipples and holes receiving them on the rim have a taper gas thread in the sections where they fit together.

BRIEF DESCRIPTION OF THE DRAWINGS

The characteristics and advantages of the invention will become clear from the following detailed description of some preferred embodiments illustrated purely by way of non-limiting example with reference to the appended drawings in which.

DETAILED DESCRIPTION OF THE INVENTION

In the drawings, the number 1 indicates as a whole a wheel including a rim 2, a hub 3 and a plurality of spokes 4 secured at the respective and opposite ends respectively to the rim 2 and the hub 3 by means of nipples 5 and 6 respectively. The rim 2 is of the single-channel type, that is with the nipples 5 facing directly into the inflation chamber of the tire.

The spokes 4 in the first example (FIG. 1) comprise a stem 8 preferably produced from light alloy, for example aluminium alloy, having at its respective opposite longitudinal ends threaded blind holes 7 a, b. Screwed into the blind hole 7a facing towards the hub 3 is a threaded end 9 of a stud 10 the opposite threaded end 11 of which is fitted into the threaded hole 12 in the nipple 6 providing the attachment to the hub 3.

Figure 1:
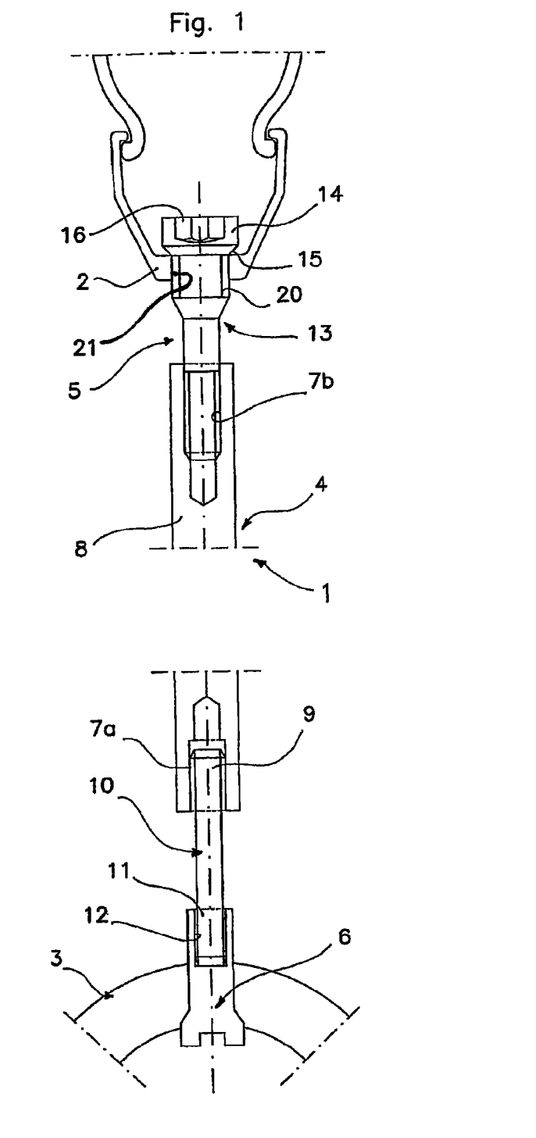
FIG. 1 is a view in section of a portion of spoked wheel produced according to the invention.

Into the blind hole 7b at the end facing towards the rim is fitted the threaded stem of the nipple 5 providing the attachment to the rim 2.

On the nipple 5 there is a cylindrical shank 13 having at one end a broadened head 14 which forms a shoulder 15 relative to the shank. A driving key feature 16 is made in the head and is used to screw the nipple into the hole 7b. This driving key feature may be produced in various forms, for example a polygon, a hexagonal recess, a slot for a screwdriver or other provision.

Once the nipple 5 is screwed into the hole 7b it is locked for example by means of thread locking adhesives known in themselves.

The nipple 5 has a threaded portion 20 on the shank 13, having a taper gas thread.

Similarly, the hole 21 in the rim 2 into which the nipple 5 is fitted has a taper gas thread so as to engage with the taper gas thread of the nipple forming a fluid-tight seal.

Sealing may be further improved using adhesives, sealants and the like. In that case, conventional parallel threads may be used or sealing components fitted between the head of the nipple and the rim.

Figure 2:
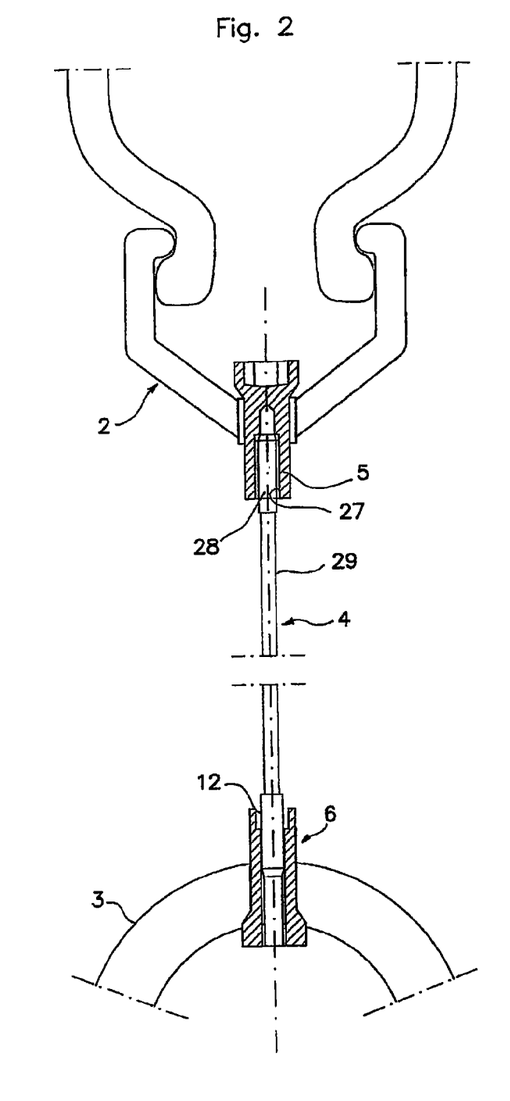
FIG. 2 is a view in section of a portion of spoked wheel in a variant of the embodiment shown in FIG. 1.

This structure lends itself particularly to the use of light alloy spokes. If it is wished to use spokes with steel stems instead, the solution illustrated in FIG. 2 is preferred, differing from the preceding example in that the nipple 5 securing the spoke to the rim has a blind threaded hole 27 into which is fitted a threaded end 28 of the stem 29 of the spoke.

At the opposite end the spoke has the same threaded end fitted into the hole 12 in the nipple 6. In this case too, the shank of the nipple 5 is threaded externally with a taper gas thread and the same thread is made in the hole made in the rim 2 to house the nipple.

Although the solution using taper gas threads is indicated as preferred, it should be understood that these threads may also be of different pitch and profile, with or without taper.

Another example of embodiment of the present invention is described with reference to FIG. 3. Similar parts are indicated by the same reference numbers as in the preceding drawings. In this case the nipple 5, with a shank 13 provided with either a parallel or taper external thread has internally a threaded blind hole 27 into which is screwed a threaded end of a stud 30 the opposite end of which, also threaded, is screwed into a corresponding blind hole 7b in the spoke 4. The spoke and nipple have facing surfaces 31a and 31b, respectively which can be butted together so that by means of the stud 30 the spoke and nipple are attached to each other to form a single unit. Provision is also made, by way of a variant, for the spoke and nipple to be produced in one piece.

Figures 3, 4:
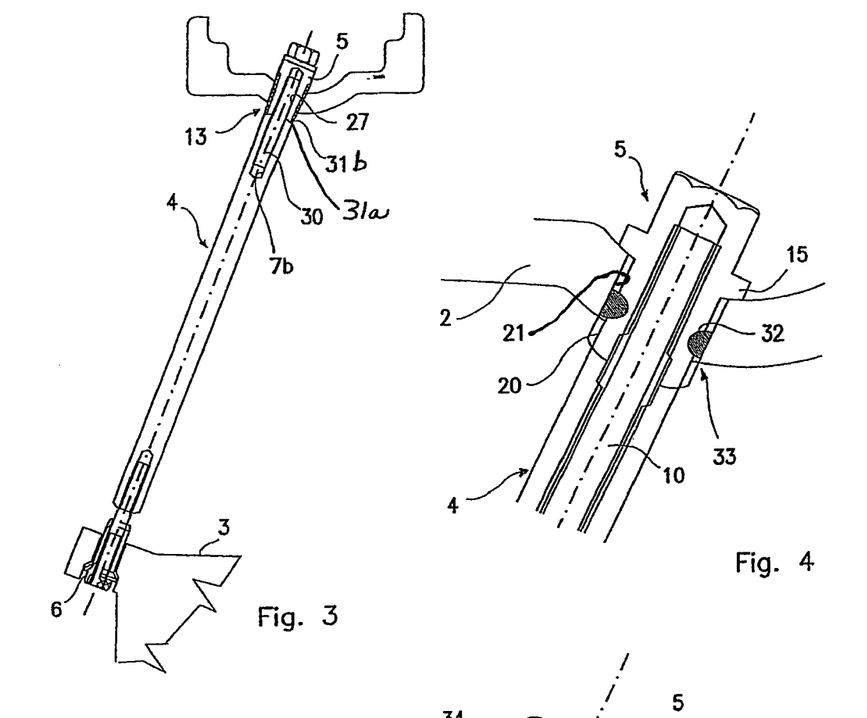
FIGS. 3 to 25 are views in section of portions of spoked wheels according to further variants of the embodiment shown in FIG. 1.

A variant of this example is illustrated in FIG. 4. In this case, a groove 32 is made in the shank 13 of the nipple 5, and this houses an O-ring 33 (OR) which is fitted in the threaded wall of the hole 21 in the rim 2, forming a seal.

It will be noted that in this case too, since the nipple 5 is locked axially bidirectionally in the hole 21 in the rim due to the effect of the shoulder 15 at one end and of the thread 20 at the other end, there is no relative slippage between the nipple and the hole in the rim so that the airtightness of the seal 33 is not compromised.

Figure 5:
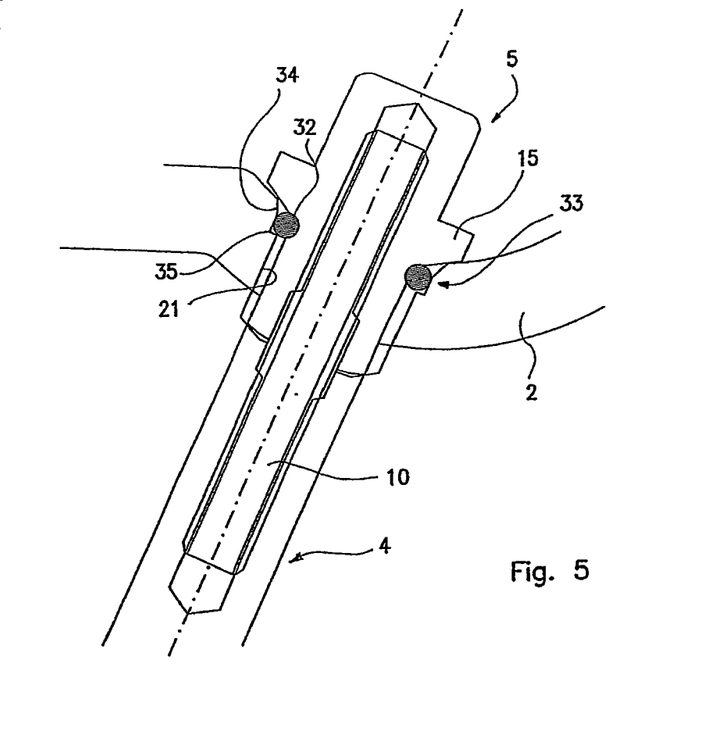
Figure 6:
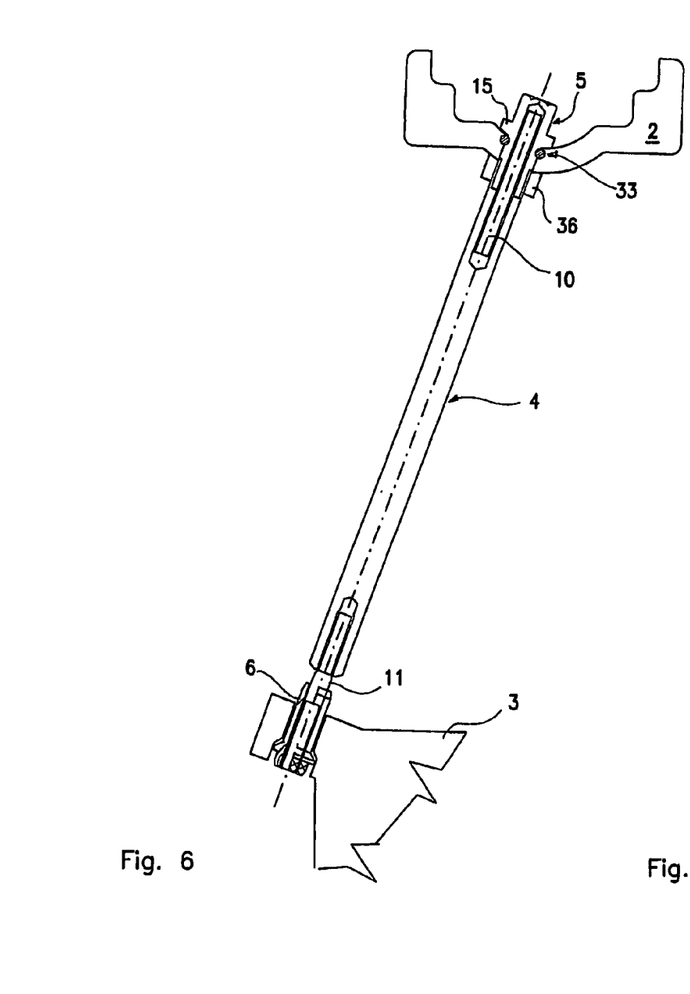
Figure 7:
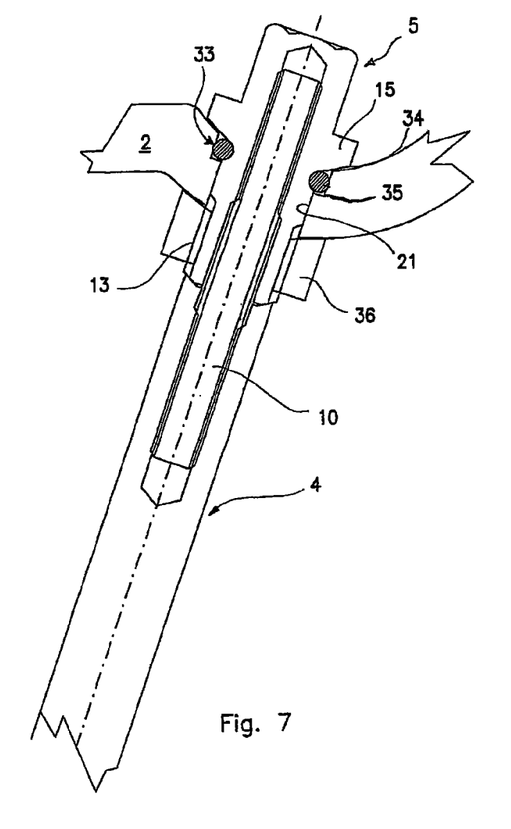

Another preferred example of embodiment of the invention is described with reference to FIG. 5.

In this example the O-ring 33 is fitted between the shoulder 15 and an annular seating 34 preferably with a cylindrical wall, made at the mouth of the hole 21. In this case the groove 32 is made close to the shoulder 15 and fluid-tightness is achieved with the cylindrical wall 35 of the seating 34. In this case too the nipple 5 is locked axially in the hole 21 in both directions.

Two other examples are described with reference to FIGS. 6 to 9. These examples differ in that they allow spokes with a light alloy stem to be used rather than spokes with a steel stem; in the latter case, the invention allows entirely conventional spokes to be used.

In both cases, a nipple is used similar to that described with reference to the example in FIG. 5 which, instead of being fitted into the hole 21 in the rim 2 by being screwed in, is fitted into it so as to be able to rotate freely and is locked axially and bidirectionally by means of a nut 36 screwed onto the threaded section of shank 13 projecting from the rim 2 through the hole 21. Axial bidirectional locking is obtained here between the shoulder 15 and the nut 36. The O-ring 33 as in the case of the previous example is subjected to a limited axial load and is fitted to form a seal with the cylindrical wall 35 of the seating 34.

Figure 8:
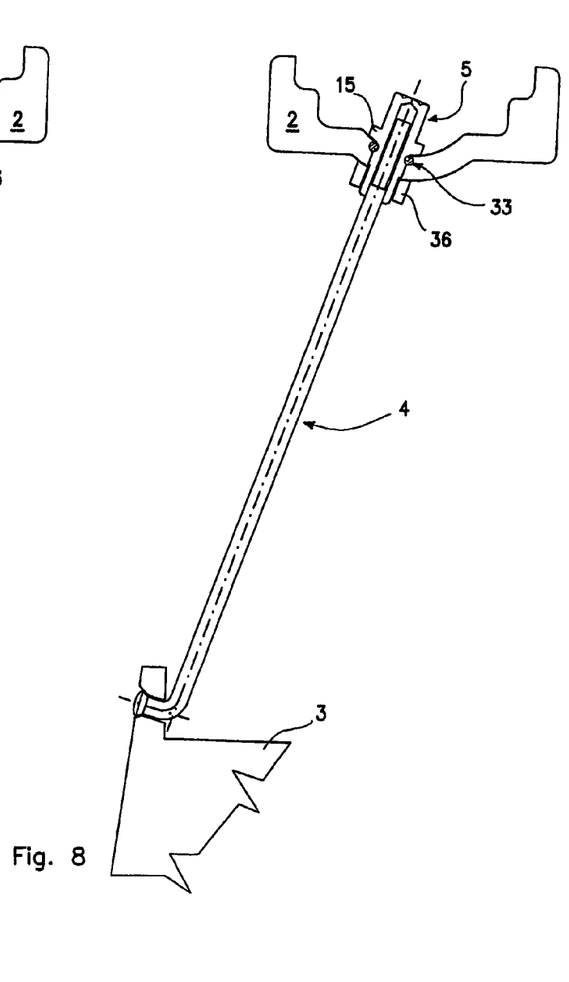
Figure 9:
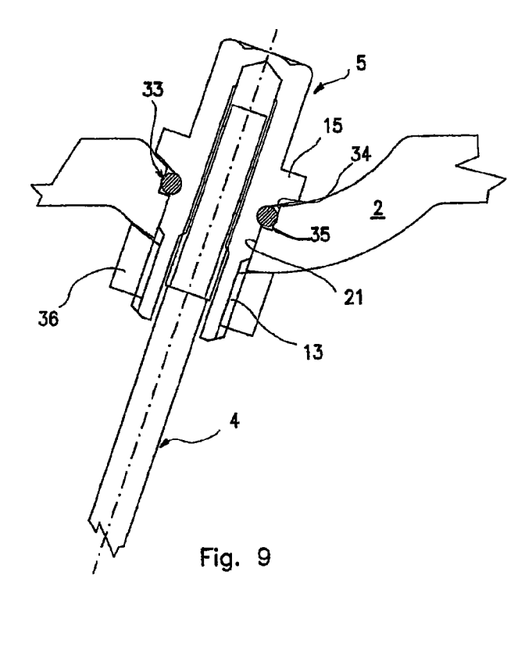

Using both these examples, but in particular with the one shown in FIGS. 8 and 9 which employs an entirely conventional spoke, it is possible to rotate the nipple 5 to obtain correct tensioning of the wheel and then lock the nut 36 to obtain complete and final assembly of the wheel.

Assembly of the wheel in all examples except the last one just described proceeds as follows. First of all the nipples 5 are screwed into the respective holes in the rim 2 housing them and are tightened by means of the driving key feature 16. Then the spokes are fitted by screwing them to the respective nipples. The free end of the spokes is then secured with appropriate adjustment to the hub by means of the nipples 6.

Figure 10:
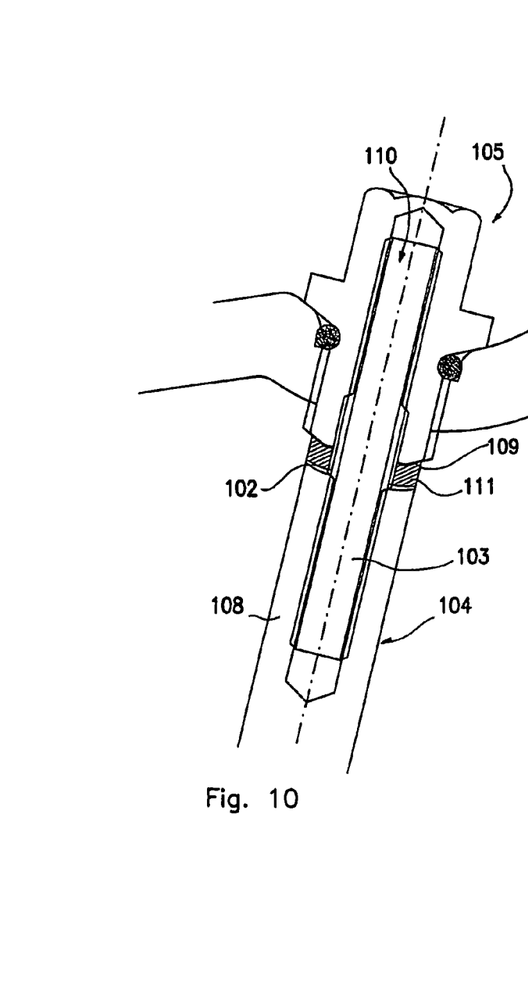

Another variant embodiment of the invention is illustrated in FIG. 10.

This variant takes account of the problems deriving from the fact that in assembling the wheel, if the holes receiving the nipples in the rim are not perfectly aligned with the corresponding holes in the hub (and there never is perfect alignment) the stem of the spoke is subject to bending stresses to compensate for this misalignment. This bending generates uneven stresses creating overloading particularly in the outermost parts, furthest from the axle, in the cross-section of the spoke.

In the case of spokes with light alloy stems, the effect is increased due to the larger diameter of the spoke. To eliminate this disadvantage, in the example in FIG. 10 provision is made for the larger diameter part, of aluminium alloy, of the stem 108 of the spoke 104 not to abut against the facing surface 109 of the nipple 105 but to be held apart from it by a space 102 and joined only by the stem 103 of the stud 110. To prevent the ingress of water into the space 102, provision is made for a deformable elastomer seal 111 to be inserted into it, functioning both as a compensating rubber washer and as a deformable sealing element closing off the space 102.

Figure 11:
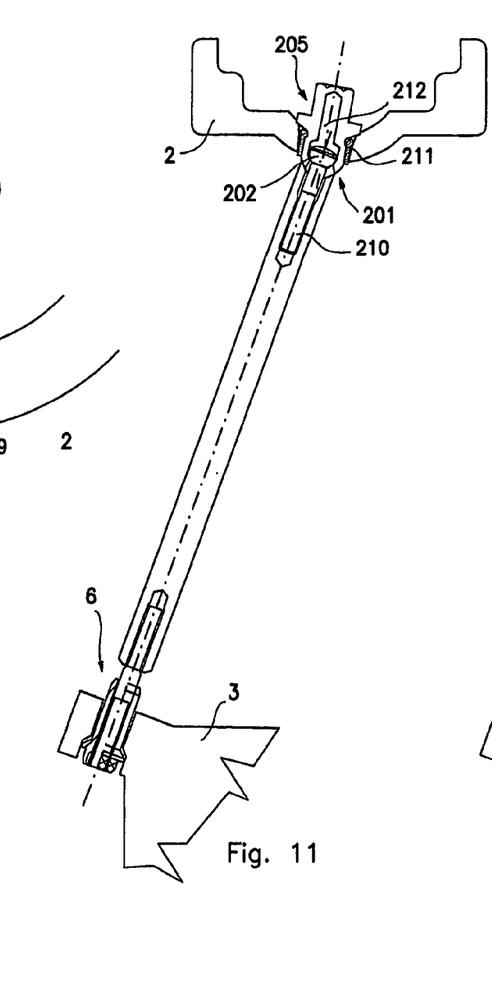
Figure 12:
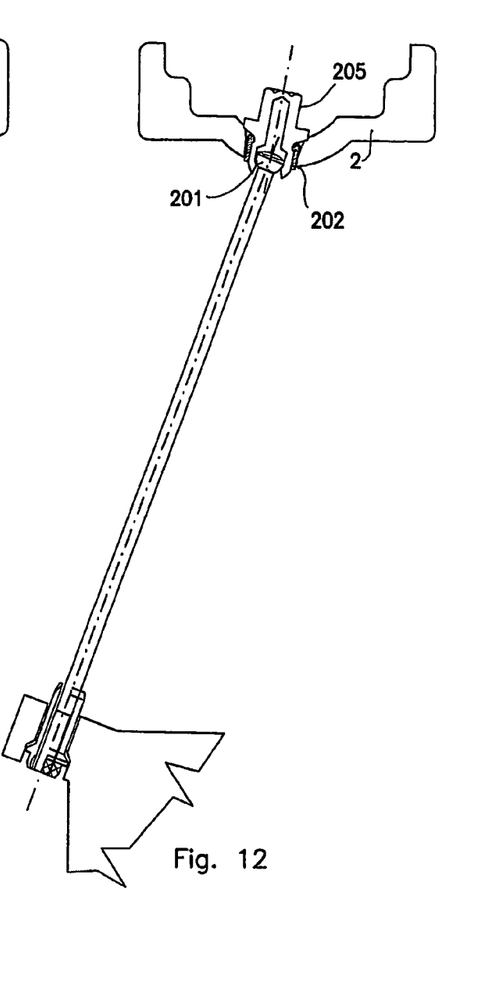
Figure 13:
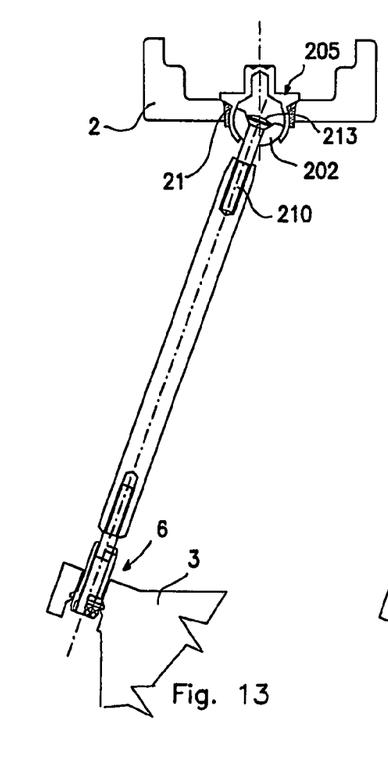
Figure 14:
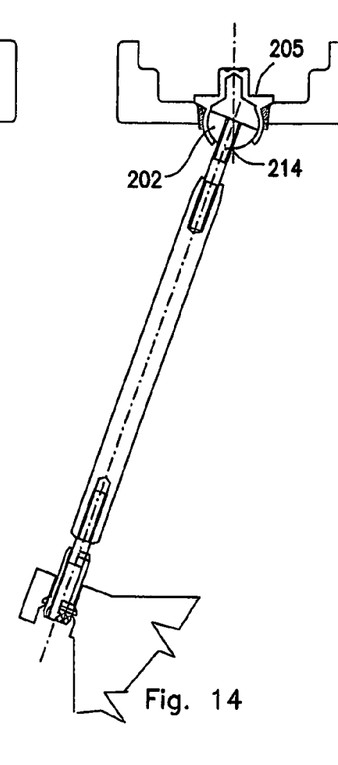

With reference to FIGS. 11 to 22, other examples of embodiment of spoked wheels according to the invention provide for the nipple to be connected to the spoke by a pivoting attachment. In FIG. 11, a pivot 201 is produced by providing a partially spherical swivel head 202 at the end of the stud 210 which is fitted into a rounded seating 211 in an axial cavity 212 of the nipple 205. The partially spherical swivel head can also be made directly on the stem of the spoke where the spokes are of steel or materials of corresponding strength (FIG. 12).

Figure 15:
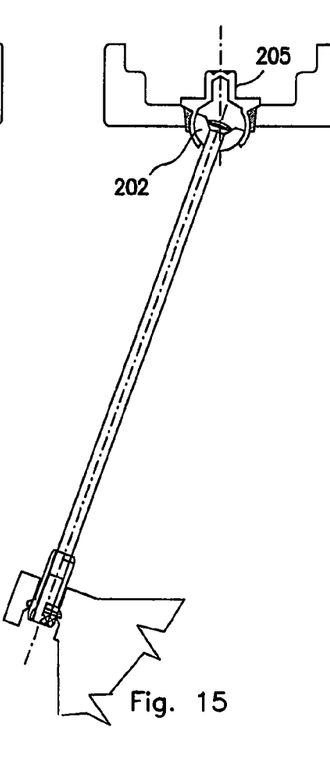
Figure 16:
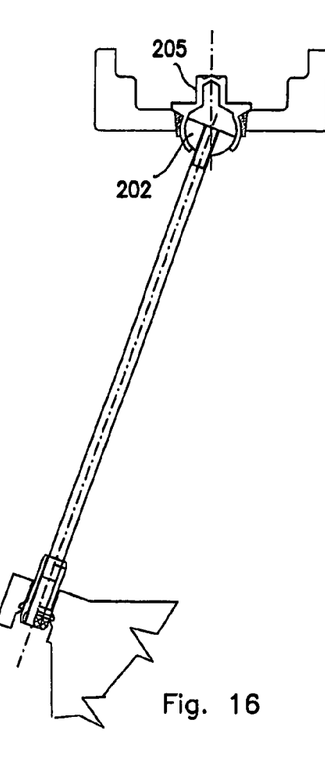
Figure 17:
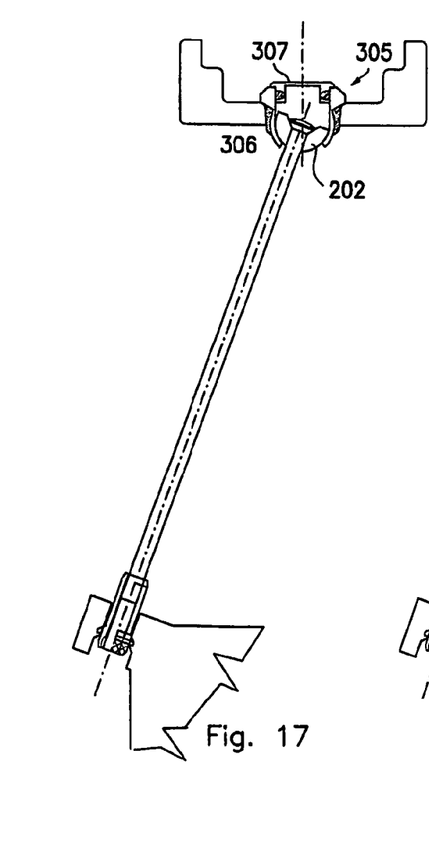
Figures 18, 19, 20:
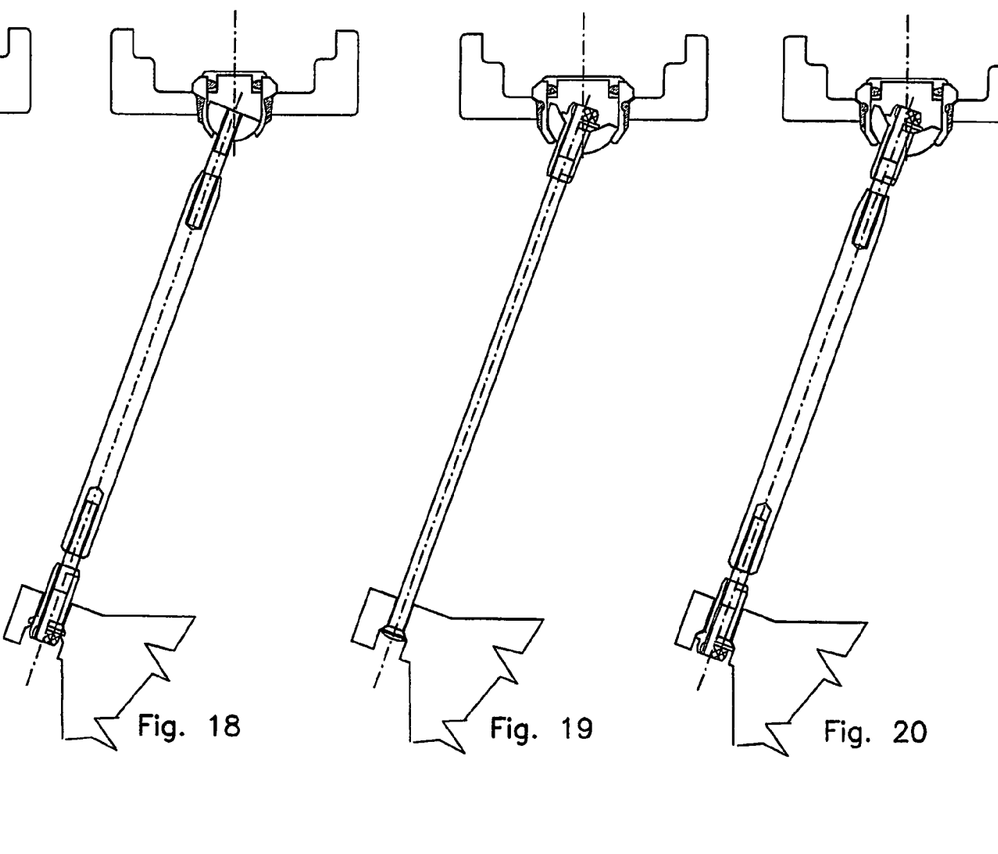
Figure 21:
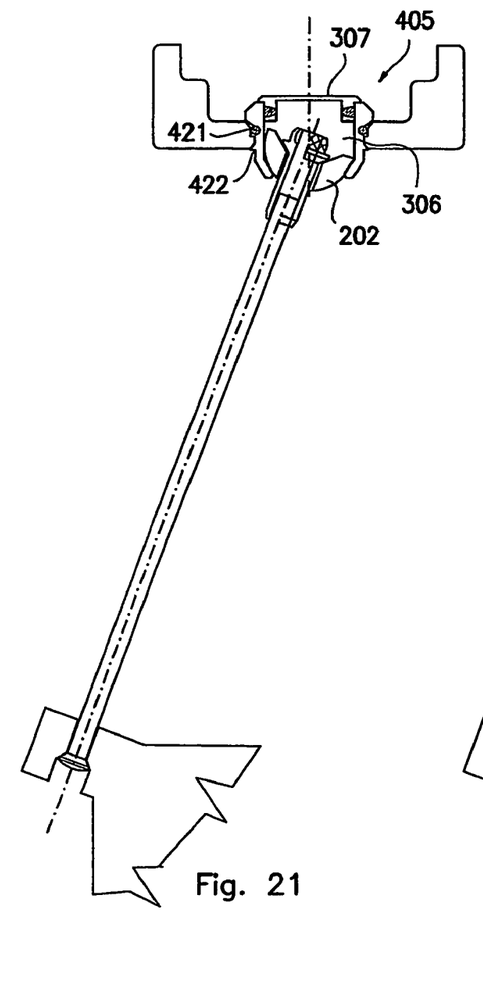

The partially spherical swivel head, as can be seen from the examples in FIGS. 13 to 21, may also have a marked curvature which allows the hole 21 in the rim receiving the nipple 205 to be made with an axis radial to the rim, leaving the offset to be taken up entirely by the spherical swivel 202. The joint between the spherical swivel 202 and the stem of the spoke may be obtained by means of a head 213 on the stud 210 (FIG. 13), by a threaded joint 214 (FIG. 14) or, in a similar manner, directly by the stem of the spoke (FIGS. 15 and 16).

Figure 22:
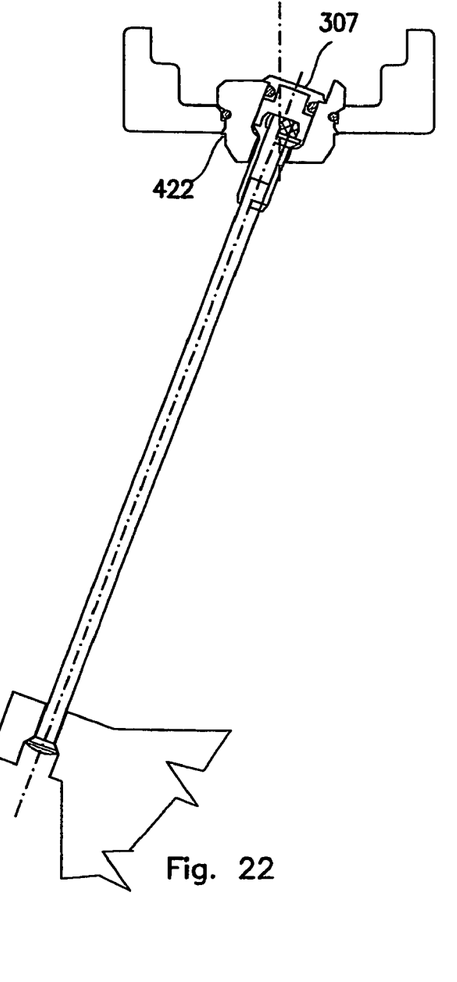

With reference to FIGS. 17 to 22 provision is also made for the nipple 305 to have a seating 306 open towards the channel in the rim 2 with closure provided by means of a cover 307 fitted by pressing onto the nipple 305 or using a threaded joint. In another variant of the invention, illustrated in FIGS. 21 and 22, provision is made for the nipple 405 to be inserted into the hole 421 in the rim and locked bidirectionally in it by upsetting 422 or other mechanical securing operation. In FIG. 22, provision is made for the seating for the partially spherical swivel to be machined at an angle in line with the spoke.

Figure 23:
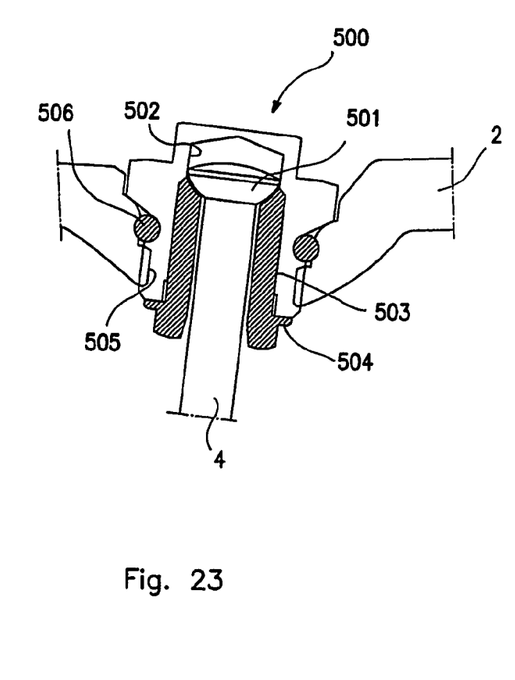

In FIG. 23, the spoke 4 has one end, housed in a nipple 500, in the form of a flared head 501 held so as to allow slight axial movement in a chamber 502 of the nipple 500 by means of a sleeve 503 which is screwed into a blind axial hole in the nipple 500. The sleeve 503 is locked by a shoulder 504 abutting against the end of the nipple facing towards the wheel hub. The nipple 500 is in turn screwed into the hole 505 in the rim and locked axially relative to it so as to be airtight with a seal 506 fitted between them.

Figure 24:
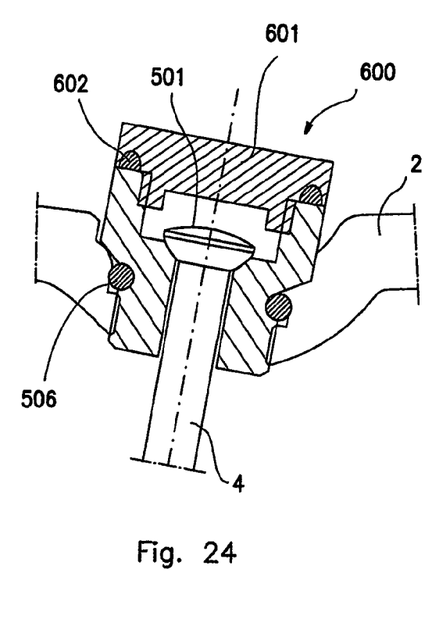

The example in FIG. 24 has a nipple shown as 600. It is substantially similar to the previous one and therefore has identical reference numbers to indicate identical parts. It differs from the previous example in that the nipple 600 can be opened at the end facing the spoke 4, where it has a removable airtight closure formed by a screw cover with a seal 602 inserted. The sleeve 503 is omitted.

Figure 25:
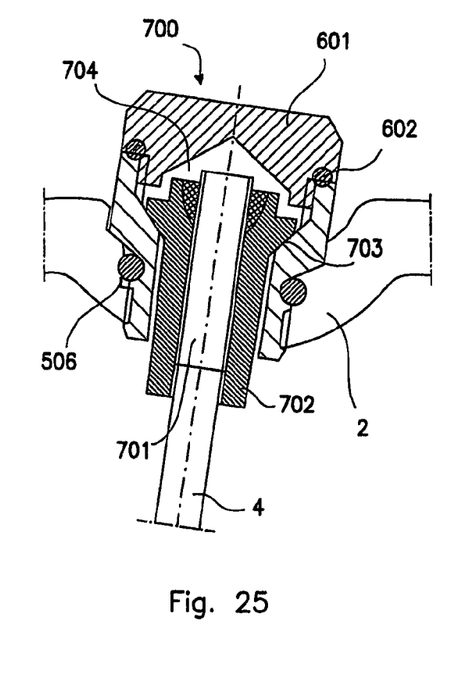

The nipple in the example in FIG. 25 is shown as 700. It is substantially similar to the previous one and therefore has identical reference numbers to indicate identical parts. It differs from the example in FIG. 24 in that the spoke 4 terminates in a threaded length 701 onto which is screwed a conventional nipple of the type with a cylindrical shank 702 widened into a flared portion 703 and locked by pouring in thread locking resin 704.

The invention thus achieves the proposed purpose and secures numerous advantages compared with the known technology. In particular, it allows the production of lightweight wheels, with reduced rotating mass, safe both in use at high speed and in case of accidental impacts.

The invention claimed is:

1. A spoked wheel for use with a tire comprising:
 a rim having a plurality of holes;
 a respective plurality of nipples;
 an axial bidirectional locking means formed on a portion of each of said respective plurality of nipples, said axial bidirectional locking means comprising a shoulder at one end of the shank of the nipple and also an external thread on the shank of the nipple which engages with a female thread disposed in a nut adjacent an outside portion of the rim to hold said nipple on the rim with said shoulder abutting against said rim;
 a resilient seal fitted onto the shank of the nipple close to said shoulder;
 a seating coaxial with the hole and adapted for fitting said seal is formed as a counter bore in the hole in the rim, said seating having a substantially cylindrical wall and forming an abutment for said shoulder; and
 an equal plurality of spokes secured to said rim by means of said respective plurality of nipples,
 wherein each nipple is disposed in the respective hole in the rim and retained in said hole by a respective one of said axial bidirectional locking means so as to be substantially gastight in the rim.

2. A wheel according to claim 1 in which said nut is screwed onto the shank of the nipple to grip said rim between said nut and said shoulder.

3. A wheel according to claim 1, wherein said rim is adapted such that the plurality of nipples face into an inflation chamber of the tire.

4. A wheel according to claim 1 in which said seal comprises an O-ring.

5. A wheel according to claim 1 in which the shoulder and the nut are provided at opposite sides of the rim so as to form said axial bidirectional locking means.

6. A wheel according to claim 1, wherein said rim is adapted such that the plurality of nipples face into an inflation chamber of the tire.

7. A wheel according to claim 1 in which said spoke has a light alloy stem.

8. A wheel according to claim 7 in which the spoke is held abutted against the nipple as an extension of it.

9. A wheel according to claim 1 in which the nipple has a blind axial hole running through it.

10. A wheel according to claim 1 in which said nipple has a head shaped to provide a key feature for driving the nipple.

11. A wheel according to claim 1 in which said counter bore in each of said plurality of holes formed in the rim has a first diameter disposed adjacent an outside portion of the rim and a second diameter greater than said first diameter disposed adjacent an inside portion of the rim.

12. A wheel according to claim 1 in which said shoulder has a beveled portion adapted to mate with an inside portion of the rim.

13. A spoked wheel for use with a tire comprising:
 a rim having a plurality of holes;
 a respective plurality of nipples, said nipples comprising a threaded stem screwed into and retained in a respective threaded hole made in the end of the spoke facing them;
 an axial bidirectional locking means formed on a portion of each of said respective plurality of nipples, said axial bidirectional locking means comprising a shoulder at one end of the shank of the nipple and also a thread on the shank of the nipple which engages with a corresponding thread disposed adjacent an outside portion of the rim to hold said nipple on the rim with said shoulder abutting against said rim;
 a seal fitted onto the shank of the nipple close to said shoulder;
 a seating coaxial with the hole and adapted for fitting said seal is formed as a counter bore in the hole in the rim, said seating having a substantially cylindrical wall and forming an abutment for said shoulder; and
 an equal plurality of spokes secured to said rim by means of said respective plurality of nipples,
 wherein each nipple is disposed in the respective hole in the rim and retained in said hole by a respective one of said axial bidirectional locking means so as to be substantially gastight in the rim, and
 wherein said nipples comprise a threaded stem screwed into and retained in a respective threaded hole made in the end of the spoke facing them.

14. A wheel according to claim 13 in which said counter bore in each of said plurality of holes formed in the rim has a first diameter disposed adjacent an outside portion of the rim and a second diameter greater than said first diameter disposed adjacent an inside portion of the rim.

* * * * *